(12) United States Patent
Ruutu et al.

(10) Patent No.: US 7,528,772 B2
(45) Date of Patent: May 5, 2009

(54) PROVISION OF LOCATION INFORMATION

(75) Inventors: Ville Ruutu, Espoo (FI); Jarko Niemenmaa, Espoo (FI)

(73) Assignee: Nokia Corporation, Espoo (FI)

( * ) Notice: Subject to any disclaimer, the term of this patent is extended or adjusted under 35 U.S.C. 154(b) by 634 days.

(21) Appl. No.: 10/501,954

(22) PCT Filed: Jan. 21, 2002

(86) PCT No.: PCT/IB02/00916

§ 371 (c)(1),
(2), (4) Date: Aug. 10, 2004

(87) PCT Pub. No.: WO03/060547

PCT Pub. Date: Jul. 24, 2003

(65) Prior Publication Data

US 2005/0046613 A1    Mar. 3, 2005

(51) Int. Cl.
*G01S 1/00* (2006.01)
(52) U.S. Cl. .............. 342/357.09; 342/357.15; 342/357.06
(58) Field of Classification Search ........... 342/357.06, 342/368, 378, 357.1, 357.02; 455/456.1, 455/456.3
See application file for complete search history.

(56) References Cited

U.S. PATENT DOCUMENTS

| | | | |
|---|---|---|---|
| 5,917,446 A * | 6/1999 | Greenspan | 342/373 |
| 5,945,944 A | 8/1999 | Krasner | |
| 5,945,948 A * | 8/1999 | Buford et al. | 342/457 |
| 6,016,322 A * | 1/2000 | Goldman | 370/508 |
| 6,081,229 A | 6/2000 | Soliman et al. | |
| 6,166,685 A * | 12/2000 | Soliman | 342/357.1 |
| 6,188,351 B1 * | 2/2001 | Bloebaum | 342/357.15 |
| 6,188,354 B1 | 2/2001 | Soliman et al. | |
| 6,204,808 B1 * | 3/2001 | Bloebaum et al. | 342/357.07 |
| 6,236,365 B1 * | 5/2001 | LeBlanc et al. | 342/457 |

(Continued)

OTHER PUBLICATIONS

3GPP TS 04.35 V8.4.1 (May 2002); "3$^{rd}$ Generation Partnership Project; Technical Specification Group GSM EDGE Radio Access Network; Location Services (LCS); Broadcast Network Assistance for Enhanced Observed Time Difference (E-OTD) and Global Positioning System (GPS) Positioning Methods (Release 1999)"; pp. 1-35.

(Continued)

*Primary Examiner*—Thomas H Tarcza
*Assistant Examiner*—Harry Liu
(74) *Attorney, Agent, or Firm*—Squire, Sanders & Dempsey L.L.P.

(57) ABSTRACT

A method of providing information regarding the location of a mobile user equipment (1) in a system wherein the location is determined based on information signalled from entities (10) of a positioning system and assistance data signalled from a station (5) of a communication system. In the method the likely location of the mobile user equipment relative to the station is first determined. Based on the determined likely location, an estimate of the delay in transmitting a signal from the station to the mobile user equipment is estimated. Assistance data is then signalled from the station to the mobile user equipment, said assistance data comprising information about the timing of the positioning system. A more accurate location determination is accomplished at the user equipment based on signals from the entities of the positioning system, the assistance data and said estimated delay.

15 Claims, 3 Drawing Sheets

U.S. PATENT DOCUMENTS

| | | | |
|---|---|---|---|
| 6,249,253 | B1 | 6/2001 | Nielsen et al. |
| 6,405,047 | B1* | 6/2002 | Moon ........................ 455/456.1 |
| 6,452,541 | B1* | 9/2002 | Zhao et al. ............. 342/357.06 |
| 6,473,038 | B2* | 10/2002 | Patwari et al. ............... 342/450 |
| 6,677,894 | B2* | 1/2004 | Sheynblat et al. ......... 342/357.1 |
| 6,756,938 | B2* | 6/2004 | Zhao et al. ............. 342/357.09 |
| 6,952,181 | B2* | 10/2005 | Karr et al. .................... 342/457 |
| 6,954,643 | B2* | 10/2005 | Petrus ......................... 455/437 |
| 6,957,072 | B2* | 10/2005 | Kangras et al. .......... 455/456.1 |
| 7,095,983 | B1* | 8/2006 | Austin et al. ............. 455/67.11 |
| 2001/0022558 | A1* | 9/2001 | Karr et al. .................... 342/450 |
| 2002/0098839 | A1* | 7/2002 | Ogino et al. ................. 455/424 |
| 2002/0123352 | A1* | 9/2002 | Vayanos et al. ............. 455/456 |
| 2005/0043038 | A1* | 2/2005 | Maanoja et al. .......... 455/456.1 |

OTHER PUBLICATIONS

3GPP TS 04.31 V7.3.0 (Nov. 2000); 3$^{rd}$ Generation Partnership Project; Technical Specification Group GSM EDGE Radio Access Network; Location Services (LCS); Mobile Station (MS)—Serving Mobile Location Centre (SMLC) Radio Resource LCS Protocol (RRLP) (Release 1998).

PowerPoint presentation in a Location Forum Meeting of Nov. 17, 2000 by a representative of VODAFONE.

* cited by examiner

```
┌─────────────────────────────────────────────────┐
│ Determine the likely location of a mobile station│
│ relative to a station of a communication system │
└─────────────────────────────────────────────────┘
                        ↓
┌─────────────────────────────────────────────────┐
│ Based on said likely location, determine an estimate│
│ of the delay before a signal from the station is │
│ received at the mobile station                  │
└─────────────────────────────────────────────────┘
                        ↓
┌─────────────────────────────────────────────────┐
│ Signal from the station to the mobile station   │
│ information about the timing of a positioning system│
└─────────────────────────────────────────────────┘
                        ↓
┌─────────────────────────────────────────────────┐
│ Determine the location of the mobile station based on│
│ signals from the positioning system, information│
│ about the timing and the estimated delay information│
└─────────────────────────────────────────────────┘
```

Fig. 3

PROVISION OF LOCATION INFORMATION

FIELD OF THE INVENTION

The present invention relates to provision of information regarding location of a mobile user equipment, and in particular to compensation of inaccuracies in timing information used in determining the location of a mobile user equipment such as a mobile station.

BACKGROUND OF THE INVENTION

In wireless communication systems such as those known as cellular communications systems a mobile user equipment such as a mobile station communicates with other stations via a wireless interface. In a cellular system the mobile user equipment such as a portable handset or other mobile station is served by radio access entities referred to as cells, hence the name cellular system. In a cellular system, the cell is provided by means of a base transceiver station (BTS). A base station may provide more than one cell and a cell may be provided by more that one base station. E.g. the $3^{rd}$ generation telecommunications standards may refer to the base station as node B. Regardless the standard, the term base station will be used in this document to encompass any such element of an access entity which transmits to and/or receives signals from a mobile user equipment or the like via an air interface.

As the approximate size and the shape of the cell is known, it is possible to associate the cell to a geographical area. The size and shape of the cells may vary from cell to cell. One or several cells may also be grouped together to form a service area (SA).

Examples of cellular communication standards, without limiting this specification to these, include the second generation (2G) GSM (Global System for Mobile communications) or various GSM based systems (such as 2G GPRS: General Packet Radio Service), the AMPS (American Mobile Phone System), the DAMPS (Digital AMPS) or $3^{rd}$ generation (3G) cellular system systems, such as the 3G GPRS and communication systems based on the WCDMA (Wideband Code Division Multiple Access), for example the UMTS (Universal Mobile Telecommunications System), IMT 2000, i-Phone and so on.

The cellular network apparatus and/or the mobile station can be employed for provision of location information of the mobile station and thus the user thereof. More particularly, the cells or similar geographically limited service areas and associated controller nodes facilitate the cellular system to produce at least a rough location information estimate concerning the current geographical location of a particular mobile station. If the location of the access entity is known, it is possible to conclude at least roughly from this information the geographical area in which the given mobile user equipment (communicating in said access entity) is likely to be at a given moment. A mobile user equipment may also be provided with appropriate equipment to generate information on which the positioning of the mobile user equipment can be based on.

Use of satellite based positioning systems for positioning of mobile stations has also been proposed. A well established satellite based positioning system is the GPS (global positioning system). Another example of the satellite based positioning system is the proposed Galileo™ location system. In the satellite based systems the positioning information is provided by means of computations that are based on the locations of the satellites and the timing of the positioning system. The timing arrangement is such that each satellite is synchronised to the one system time, or "universal time". In the following the timing of the GPS system will be referred to as the 'GPS time'.

In operation, each GPS satellite continuously transmits a bit stream containing the satellite identity, the GPS time and satellite trajectory models. The trajectory models may comprise e.g. an approximate long term model (almanac) and an accurate short term model (ephemeris). A GPS receiver can then estimate its location in three dimensional space based on the signals, typically from at least four different GPS satellites, the GPS time and other information such as the trajectory models.

A mobile station may be provided with a GPS receiver. The GPS receiver is adapted to search for the satellites, and he receive the GPS signals from the found satellites. Location determinations may then be performed at the mobile station based on the information signal received from the satellites.

A further development in the field of the GPS and the positioning of mobile stations is the so called Assisted Global Positioning System (A-GPS). The basic idea of the A-GPS is that the performance of a GPS receiver of a mobile station is enhanced by sending appropriate assistance data to the mobile station. Instead of sending such data from the satellites, the assistance data is transmitted via the air interface between the mobile station and the cellular network.

Various information may be provided as the assistance data. One of the components of the assistance data may be the GPS time. The GPS time can be used in assisting the GPS receiver to find more easily signals from GPS satellites. Further gain is obtained if the GPS time can be delivered to the mobile station (and its GPS receiver) as accurately as possible, as this will make the computation more accurate. Furthermore, less than four satellites may be enough for accurate positioning of the mobile station. The A-GPS is supported by various telecommunication standards, such as the 2G GSM and 3G UMTS specifications.

One possibility to transfer the GPS time to the mobile station is to send information about the correspondence of the GPS time relative to a timing used by the cellular system. That is, the mobile station is provided with information by means of which the GPS time can be tied to a certain event in the cellular system. This timing will herein be referred to as the cellular time.

The association of the GPS time and the cellular time is already supported, for example, by the GSM standards. For example, GSM specification No. 04.35 (version 8.1.0) describes broadcasting of GPS assistance data to user equipment. In chapter 4.2.1.6 a so called 'Reference Time Information Element' is defined as an information element (IE) that specifies the relationship between the GPS time and air-interface timing of the BTS transmission in the serving cell. In GSM specification No. 04.31 the corresponding point-to-point information is defined as fields that specify the relationship between the GPS time and air-interface timing of the BTS transmission in a reference cell.

Thus in the assisted GPS mobile location method a way of provision of the assistance data is to transfer the GPS time to the mobile by expressing the correspondence of the GPS time relative to a certain event in the cellular system. It has been proposed that in the GSM and UMTS standards the event comprises the moment of transmission of a certain signal. That is, the GPS time is expressed as a transmission moment of a certain cellular signal.

However, the Inventor has found that a problem may arise since the mobile user equipment can only detect the reception time. Since there will be at least some distance between the mobile user equipment and the transmitting base station, the moment of transmission will be different from the moment of reception due to the propagation delay. The mobile user equipment cannot relate the reception time to the transmission time of the relevant cellular signal, and thus the propagation delay may cause substantial inaccuracy in the delivered GPS time.

Best improvement in the location determination accuracy is believed to require transferring of the GPS time with an error that is less than 10 micro seconds. However, for example, in the GSM one bit period is 3.69 micro-seconds. This accuracy corresponds to 1.1 km in distance. The maximum cell size can be 35 km in a typical GSM system. Extended cell radius may also be used, these providing as large radiuses as 70 km. Thus the maximum possible propagation delay can be 116 microseconds. The delay is ten times more than the 10 micro second requirement, and equals about 34.6 km in distance.

SUMMARY OF THE INVENTION

Embodiments of the present invention aim to address the problem in the accuracy of the timing information that is used by a station such as mobile user equipment in application comprising location determinations that are based on timing information.

According to one aspect of the present invention, there is provided a method of providing information regarding the location of a mobile user equipment in a system wherein the location is determined based on information signalled from entities of a positioning system and assistance data signalled from a station of a communication system, comprising:

determining the likely location of the mobile user equipment relative to the station;

based on the determined likely location, determining an estimate of the delay between transmission of a signal from the station and reception of said signal at the mobile user equipment;

signalling assistance data from the station to the mobile user equipment, said assistance data comprising information about the timing of the positioning system; and accomplishing a more accurate location determination at the user equipment based on signals from the entities of the positioning system, the assistance data and said estimated delay.

According to another aspect of the present invention there is provided a system for determining the location of a mobile user equipment, comprising:

a positioning system comprising entities arranged to signal information, the arrangement being such that the mobile user equipment may receive and use the information from said entities when determining its location;

a station of a communication system arranged for transmission of information signals to the mobile user equipment;

location estimation means for provision of an estimate of the likely location of the mobile user equipment relative the station;

processor means for provision of an estimate of the delay between transmission of an information signal from the station and reception of said information signal at the mobile user equipment based on said estimated location; and location determination means for determining the location of the mobile user equipment based on signals from the entities of the position system, assistance data from the station, said assistance data comprising information about the timing of the positioning system and said estimate of the delay.

According to one aspect of the present invention, there is provided a mobile user equipment, comprising:

a first receiver for receiving information signals from entities of a positioning system for use in location determinations by the mobile user equipment;

a second receiver for receiving signals from a station of a communication system; and location determination means for determining the location of the mobile user equipment based on signals from the entities of the position system, assistance data signal received from the station, said assistance data comprising information about the timing of the positioning system, and a computed difference between the time of transmission of said assistance data signal from the station and the time of reception of said assistance data signal at the mobile user equipment, said difference being computed based on an estimated likely location of the mobile user equipment relative to the base station.

In a more specific form information about the estimated delay is transmitted from the station to the mobile user equipment. The estimate about the delay may alternatively be determined at the mobile user equipment.

The entities of the positioning system may comprise at least one satellite.

The delay estimate may be used to relate the timing of the positioning system with the time at which the mobile user equipment is likely to receive a certain signals. The signal may contain said assistance data. Said delay estimate may be included in the assistance data.

The likely location of the user equipment may be estimated based on information about the mass center of the coverage area of the station. Average timing advance (TA) or round trip time (RTT) may also be used in estimation of said delay. The likely location may also be determined based on information of the average location of the mobile user equipment and/or based on at least one signal strength measurement.

The embodiments of the invention may enable more accurate transfer of timing information assistance data than what was possible in the prior art. Accurate timing information may be provided for user equipment that is located in a cell that is larger than what was appropriate in the prior art solutions. The embodiments are also believed to be easy to implement, and can be applied in the already existing positioning systems.

BRIEF DESCRIPTION OF DRAWINGS

For better understanding of the present invention, reference will now be made by way of example to the accompanying drawings in which:

FIG. 3 is a flowchart illustrating the operation of one embodiment of the present invention.

DESCRIPTION OF PREFERRED EMBODIMENTS OF THE INVENTION

Figure 1:
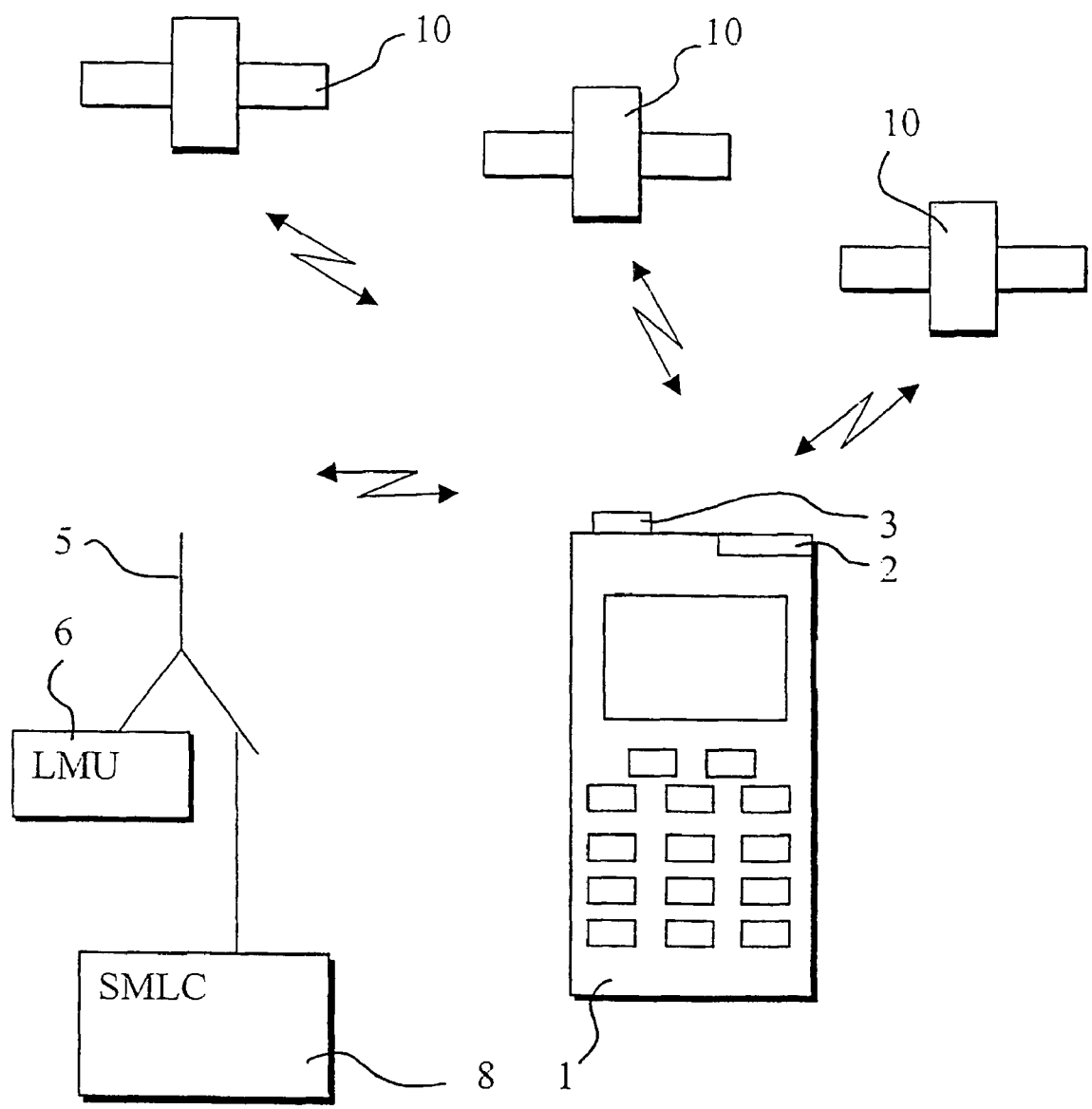
FIG. 1 shows one embodiment of the present invention.

Reference is first made to FIG. 1 which shows an embodiment of the present invention. The mobile user equipment comprises a mobile station 1 arranged for communication with a base transceiver station 5 of a cell of a cellular communication system. The communication is shown to occur via antenna means 3 of the mobile station. It shall, however, be appreciated that the antenna means 3 do not form an essential element of the present invention and may comprise any appropriate means for reception and, if necessary, transmission of signals. For example, antenna means may be integrated with any of the components of the mobile station 1, such as the cover or an internal component thereof.

The mobile station 1 also comprises a GPS receiver 2. GPS receivers as such are known and will thus not be explained in any greater detail. It is sufficient to note that the GPS receiver 2 is adapted to receive signals from GPS satellites 10. The GPS receiver 2 may also provide the mobile station 1 with other location information determination functions. The receiver 2 may, in addition to simply receiving signals from the satellites, determine the location of the mobile station 1 based on the signals from the GPS satellites 10 and assistance data from the base station 5.

In a cellular system each of the cells can be controlled by an appropriate controller apparatus (not shown). For example, in a WCDMA radio access network the base station is connected to and controlled by a radio network controller (RNC). In the GSM radio network the base station is typically connected to and controlled by a base station controller (BSC) of a base station subsystem (BSS). The BSC/RNC may be then connected to and controlled by a mobile switching center (MSC) or similar controller entity. Other controller nodes may also be provided, such as a serving GPRS support node (SGSN). The controllers of a cellular network are typically interconnected and there may be one or more gateway nodes connecting the cellular network e.g. to a public switched telephone network (PSTN) and other telecommunication networks such as to the Internet and/or other packet switched networks. Since the operation of the various controllers is not essential for the operation of the present invention, it is not necessary to shows or describe these in any greater detail herein.

Entities such as a location measurement unit (LMU) 6 and a serving mobile location center (SMLC) 8 may also be provided. The operation of these entities will be explained later.

Figure 2:
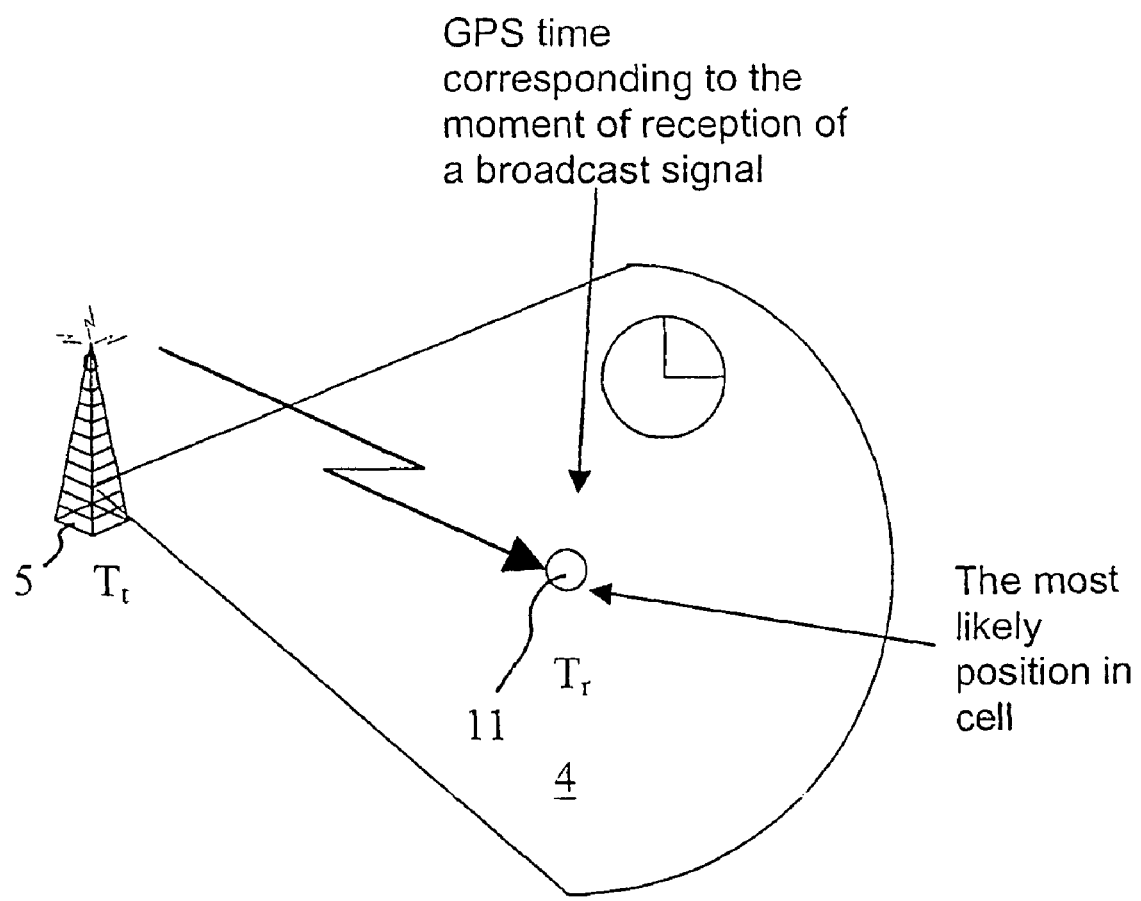
FIG. 2 shows an example of the operation of operation in accordance with the present invention.

In operation the timing of the satellite based positioning system i.e. the GPS time is sent to the mobile station 1 as the assistance information from the cellular system, see FIG. 2. As shown in FIG. 3, instead of using a GPS time that is linked to the broadcast transmission time Tt of a certain cellular signal in the cell 4 the GPS time is linked to the timing of the cellular system based on an estimated reception time Tr of the cellular signal at the mobile station.

In TDMA (time division multiple access) cellular systems, such as e.g. in the GSM, the mobile station knows the so called timing advance (TA) value if it has a two-way communication channel open to the network. The TA represents the back-and-forth time delay between the mobile station and the servicing base station. In normal operation the mobile station uses the TA to adjust its transmission timings in order to ensure that its transmissions arrive at the servicing base station at the allocated time slot. Thus a mobile station that has an active connection with the base station may already be provided with an estimate of the about the time delay. However, another estimate of the delay is required even in such situation e.g. when the mobile station does not have an active connection (the mobile station is, for example, in idle state) or when it is not provided with the TA value for any other reason.

The reception time Tr may be estimated based on information about the likely position 11 of the mobile station within the cell 4. Since the speed of travel of the cellular signal is known, the likely location of the mobile station makes it possible to compute an estimate for the delay (or offset) between the moments of transmission from the base station 5 and the reception at the mobile station.

The estimation of the delay may be accomplished in any appropriate location service entity such as the Serving Mobile Location Center (SMLC) 8 or in the location measurement unit (LMU) 6. The estimation may also be accomplished by any of the network controllers. For example, a base station controller (BSC) or radio network controller (RNC) may be used for the provision of the estimate. It shall also be appreciated that the SMLC may be provided in connection with a BSC.

The GPS time may be "corrected" by the MS. This requires that the mobile station is provided with information based on which it may compensate any delay in the reception time. For example, the assistance data message may comprise an additional information element such as a data field for the delay information.

The delay may also be compensated by the network. That is, the delay may be taken into account before sending the assistance data to the mobile station. A possibility is to "distort" the GPS timing so that the delay is compensated.

In a preferred form the most likely position of the user equipment is estimated e.g. by means of the serving mobile location center 8. The most likely position can be, for example, estimated based on information about the mass center of the coverage area of the cell 4 i.e. the area where the mobile station can receive signals from the base station. The mass center can be computed by means of the software of the SMLC.

Another possibility is to estimate the location based on information about the so called weighted mass center of the coverage area of the cell 4. The weight can be selected e.g. based on information about population density, roads, traffic densities, geographical information and so on.

Average Timing Advance (TA) value may also be determined for the cell 4. This may be done e.g. by the operation and maintenance system, or by a base station controller (BSC). This kind of functionality is already supported by some communication systems. The average TA may then be used to determine the most likely location of the mobile station.

In the 3G systems the Round Trip Time (RTT) can be used in similar manner to estimate the propagation delay and to compensate the delay in the specific mobile station.

Various other techniques may also be used to improve the accuracy of the location determination. For example, methods such as range difference (RD) measurements, observed time difference of arrival (OTDOA), and enhanced observed time difference of arrival (E-OTD), may be used for estimation of the likely position of the mobile station.

The network may also collect information about average location of users in the cell 4 based on performed normal location determinations. These may have been done e.g. for commercial applications, such as in response to request by location service clients. Any appropriate location service (LCS) entity, such as the SMLC 8 may be adapted for this purpose.

In some applications the cell middle point may be used as the likely location. This may be used e.g. for small cells such cells as wherein the radius is less than 6 km. The estimated GPS time can then be used for the whole coverage area of that cell. This is probably a viable solution for mobile stations located inside a building or e.g. in a dense city canyon environment.

In accordance with an embodiment wherein the base station broadcasts the assistance data the broadcast may include information regarding the delay in various locations, e.g. in certain distances away from the base station. That is, the broadcast assistance data may include various delay estimates for mobile stations that are located differently relative to the base station. A possibility for implementing this is that the mobile station utilises the signal strength information to determine roughly its location relative to the base station. The mobile station may then select the appropriate delay estimate parameter from the broadcast based on the estimated location. A mobile station typically measures signal strengths from more than one base station. The mobile station may thus also base the location estimate on more than one signal strength measurement.

The delay information may be included in the transmission of the assistance data. The delay information may be included e.g. in an appropriate data frame of the assistance data.

It should be appreciated that whilst embodiments of the present invention have been described in relation to mobile stations such as mobile phones, embodiments of the present invention are applicable to any other suitable type of mobile user equipment. What is required is that the use equipment is provided with means for receiving signals from at least two systems that are provided with different time bases.

The embodiment of the present invention has been described in the context of a cellular system. This invention is also applicable to any positioning system wherein information about the delay in transmission of a timing is required.

The positioning system does not necessarily need to be a satellite based system. It cam be any positioning system, such as a local land based system.

The above described the delay caused by the distance between the base station and the mobile station. Other factors may also be taken into account. For example, the propagation delay estimate may take into account any delaying effect of conditions such as reflections and non-line-of-sight (NLOS). For example, if a cell covers an area with substantially large and/or tall buildings blocking the direct signal path between the base station and the mobile station, the delay estimate may be adjusted to take into account the slightly longer propagation time of signals in such conditions.

The location information service network element such as the SMLC or a gateway mobile location center (GMLC) may act as a gateway between the communication network and a client who has requested for the location information. The geographical location of a mobile user equipment may be provided for client entities who are entitled to obtain such information. The clients may be internal or external to the communication system. The location information server responds to the request by the client based on information received from one or more of the location determination entities of the communication system, said information regarding the determined location of a target mobile user equipment. The clients may use the information about provided by the location information services of the communication system for various purposes. The use may be commercial such as advertising, looking for services in a particular area and so on. The location information may also be used for by various emergency services. The use may also be private, such as the 'find a friend service'.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   determining a likely location of mobile user equipment relative to a station;
   determining an estimate of a delay between transmission of a signal from the station and reception of said signal at the mobile user equipment based on the determined likely location;
   signaling assistance data from the station to the mobile user equipment, said assistance data comprising information about the timing of a positioning system; and
   calculating a more accurate location determination at the user equipment based on signals from the entities of the positioning system, the assistance data and said estimated delay,
   wherein the location is determined based on information signaled from entities of a positioning system and assistance data signaled from the station of the communication system.

2. A method as claimed in claim 1, wherein information about the estimated delay is transmitted from the station to the mobile user equipment.

3. A method as claimed in claim 1, wherein the estimate of the delay is determined at the mobile user equipment.

4. A method as claimed in claim 1, wherein the entities of the positioning system comprise at least one satellite.

5. A method as claimed in claim 4, wherein the positioning system comprises a global positioning system.

6. A method as claimed in claim 1, wherein the delay estimate is used to relate the timing of the positioning system with the time at which the mobile user equipment is likely to receive a certain signal from the communication system.

7. A method as claimed in claim 1, wherein the delay estimate is used to relate the timing of the positioning system with the time at which the mobile user equipment is likely to receive said assistance data signal.

8. A method as claimed in claim 1, wherein said delay estimate is included in the assistance data.

9. A method as claimed in claim 1, wherein the likely location of the user equipment is estimated based on information about the mass center of the coverage area of the station.

10. A method as claimed in claim 9, comprising use of information about a weighted mass centre.

11. A method as claimed in claim 1, wherein average timing advance or round trip time is used in estimation of said delay in transmission of signals from the station to the mobile user equipment.

12. A method as claimed in claim 1, wherein the likely location is determined based on information of the average location of the mobile user equipment.

13. A method as claimed in claim 1, wherein the likely location is determined based on at least one signal strength measurement.

14. A method as claimed in claim 1, comprising broadcasting in a cell information regarding estimated delay in transmission of signals from the base station of the cell to a mobile user equipment in a location within said cell.

15. A method as claimed in claim 1, wherein the estimated delay in transmission of the signal from the station to the mobile user equipment is determined based on information of at least one further condition regarding the radio propagation conditions of signals transmitted from the station to the mobile user equipment.

* * * * *